April 10, 1945.  E. W. SCHLIEBEN ET AL  2,373,504
SYSTEM AND APPARATUS FOR DETERMINING THE DISTRIBUTION
OF THE LOAD IN AN AIRCRAFT
Filed May 17, 1943  4 Sheets-Sheet 1

ERNEST W. SCHLIEBEN
ALBERT S. OGDEN
IRVING BERLER
INVENTORS

BY

April 10, 1945.  E. W. SCHLIEBEN ET AL  2,373,504
SYSTEM AND APPARATUS FOR DETERMINING THE DISTRIBUTION
OF THE LOAD IN AN AIRCRAFT
Filed May 17, 1943  4 Sheets-Sheet 2

ERNEST W. SCHLIEBEN
ALBERT S. OGDEN
IRVING BERLER
INVENTORS

ERNEST W. SCHLIEBEN
ALBERT S. OGDEN
IRVING BERLER
INVENTORS

ERNEST W. SCHLIEBEN
ALBERT S. OGDEN
IRVING BERLER
INVENTORS.

Patented Apr. 10, 1945

2,373,504

UNITED STATES PATENT OFFICE 2,373,504

SYSTEM AND APPARATUS FOR DETERMINING THE DISTRIBUTION OF THE LOAD IN AN AIRCRAFT

Ernest W. Schlieben, Scarsdale, N. Y., Albert S. Ogden, Upper Darby, Pa., and Irving Berler, Brooklyn, N. Y., assignors to York Research Corporation, New York, N. Y.

Application May 17, 1943, Serial No. 487,330

4 Claims. (Cl. 73—65)

This invention relates to a system and apparatus for determining the distribution of the load in an aircraft. More particularly, the invention relates to an apparatus for use in an aircraft by means of which the horizontal position of the center of gravity of the loaded craft can be readily determined at any time during and after the loading operation as long as the craft is supported on the ground.

In loading an aircraft, it is of importance that the center of gravity of the loaded craft can be quickly and accurately checked by the pilot and/or the freight handler. Means known for this purpose are generally complicated and require detailed tabulated data in which serious errors are sometimes not easily recognized; moreover they are often too intricate for the comparatively rough treatment to which they are exposed.

One object of this invention is to provide in an aircraft, supported on the ground by several supporting members, for means by which the horizontal position of the center of gravity of the aircraft in any stage of loading can be determined;

Another object of the invention is to utilize for the center of gravity determination the pressure exerted by the grounded aircraft on to the individual ground supporting means;

A further object of the invention is to determine the relative distribution of the load on the individual ground supporting members;

A still further object of the invention is to make such means for the determination of the horizontal position of the center of gravity simple, reliable and quick in operation.

Other objects and a fuller understanding of the invention may be had by referring to the following description and claims, taken in conjunction with the accompanying drawings which shall, however, be in no way limitative but merely illustrative to explain the nature and operation of the invention.

The embodiment of the invention illustrated in the accompanying drawings relates to a device in which, at the shock struts, means, such as an electric resistor, are provided which are influenced by the movement of or the pressure in the struts in consequence of the changing magnitude of the load. It may, however, be pointed out that the invention is by no means restricted to such devices.

Figure 1:
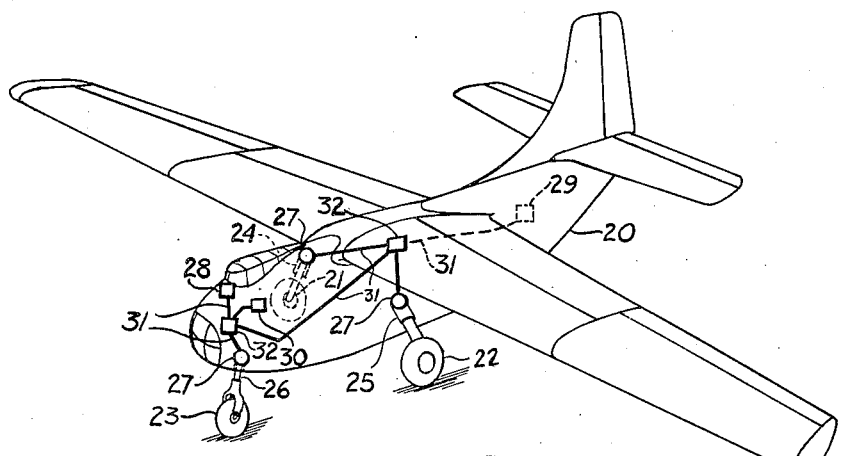
Fig. 1 is a schematic perspective view of an aircraft containing the system according to the present invention.

Fig. 1 shows an aircraft 20 of any arbitrary design resting on two main wheels 21, 22 and one nose wheel 23. Usual shock struts 24, 25, 26 are arranged between the wheels and the craft proper. These shock struts may be of any conventional design and be working hydraulically, pneumatically or by means of springs or in any other suitable manner without affecting the scope of the present invention.

At 27 electric resistors or similar means are indicated in a very schematic way. The purpose and construction of these parts which are connected with the three shock struts 24, 25, 26 will be explained later on in the description. A station 28 is indicated inside the cockpit of the aircraft. This station which will likewise be explained later on serves for the operation of the whole system and accommodates indicating instruments. A second such station 29 is indicated towards the rear of the craft which may serve the freight handler in addition to or instead of station 28. 30 represents any convenient source of electricity, e. g. a storage battery, inside the aircraft. 31 are electric conduits, 32 are junction boxes which may be necessary for the electric installation.

Figure 2:
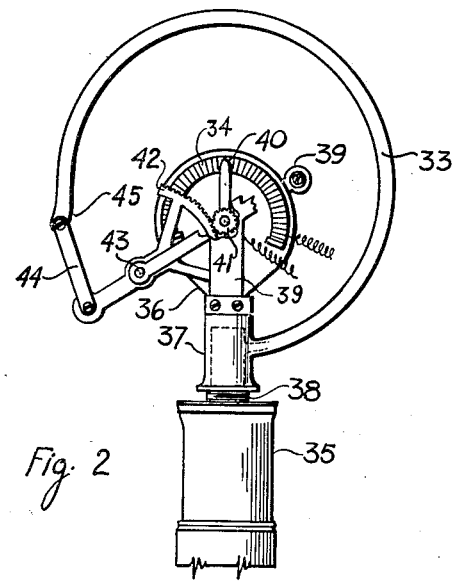
Fig. 2 is a side view, partly broken away of an embodiment as used in connection with the present invention.

According to Fig. 2, a Bourdon tube 33 is operatively connected with a variable electric resistor 34 with which it forms a unit. One such unit is attached to each of the shock struts 24, 25, 26 as indicated at 27 in Fig. 1. In Fig. 2 the upper part of the shock strut is designated with 35. The Bourdon tube 33 forms one part with its base 37 which has a threaded end 38 by means of which it is screwed into the upper part 35 of each shock strut, where pneumatic or hydraulic pressure is available for the operation of the Bourdon tube.

The circular variable resistor 34 is mounted on a plate 36 which is supported on top of base 37. Two supporting brackets 39 are screwed on two sides to the base 37. A pin in the center of the circular resistor 34 is supported by the brackets 39 and carries a contact arm 40 adapted to slide in a well known manner over the resistor 34. Said pin carries, furthermore, a pinion 41 which meshes with a rack or sector 42. Rack 42 is pivotable about a pin 43 which is supported in 2 arms extending from the brackets 39. The free end of the rack or sector 42 is linked to one end of a member 44, the other end of which is connected with the free end of Bourdon tube 33. Each change in pressure in the Bourdon tube causes a movement of its end 45 and therewith a rotation of the rack or sector, the pivot and the contact arm, varying thereby the current flowing through the resistor 34 proportionally to the pressure change in the Bourdon tube. Wires are indicated to electrically connect the resistor with the respective circuit as will be explained later on.

Figure 3:
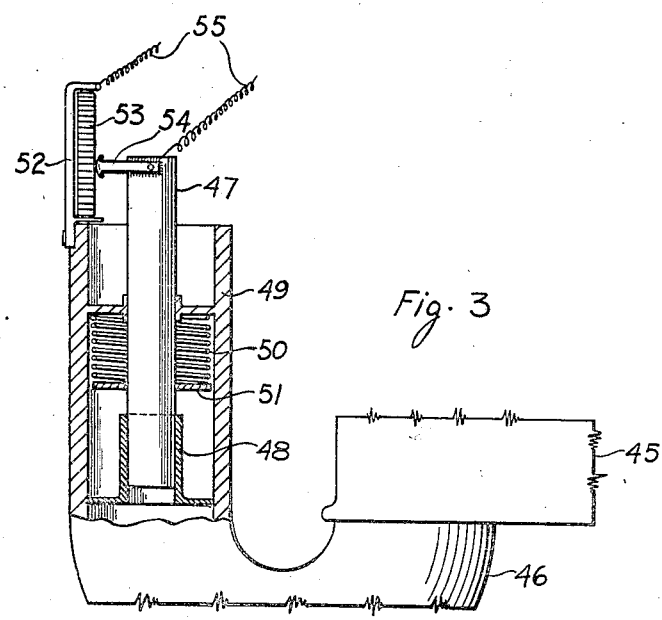
Fig. 3 is partly a longitudinal section, partly a side view of another embodiment of means used in connection with the invention.

Fig. 3 shows other means for the operation of the variable resistors in proportion to the pressures existing in or at the shock struts. At 45 a part of a shock strut is shown in which hydraulic pressure exists. A partly shown U-shaped pipe 46 is attached to part 45. The upright end of said pipe accommodates the mechanism which serves for the translation of the hydraulic pressure into mechanical displacement. A piston 47 is slidably arranged in a cylindrical guide member 48 which is secured to the inside of the upright part of the pipe 46. A plate 49 may be welded to the inside of the tube and serves as another guide for the piston and as a support for a compression spring 50, the other end of which acts against a plate 51 secured to the piston. Mounted on the upper end of tube 46 is a bracket 52 in which a variable electric resistor 53 is supported. A contact arm 54 is attached to the upper end of the piston and is adapted to slide over the surface of resistor 53. Wires 55 are indicated to electrically connect the resistor with the respective circuit as will be explained later on.

The operation of the parts shown in Fig. 3 is obvious. The hydraulic pressure existing in part 45 of the shock strut acts on the piston 47 moving the same upwards. As the variations of the pressure in the shock strut are proportional to the variations in the magnitude of the load applied to the shock strut, the upward movement of the piston is likewise proportional to the load variations. Accordingly, the variations of the electric properties of resistor 53 are also proportional to the load variations, as the resistor is adjusted by the contact arm 54 attached to piston 47. Spring 50 serves to move the piston back into its initial position.

Figure 4:
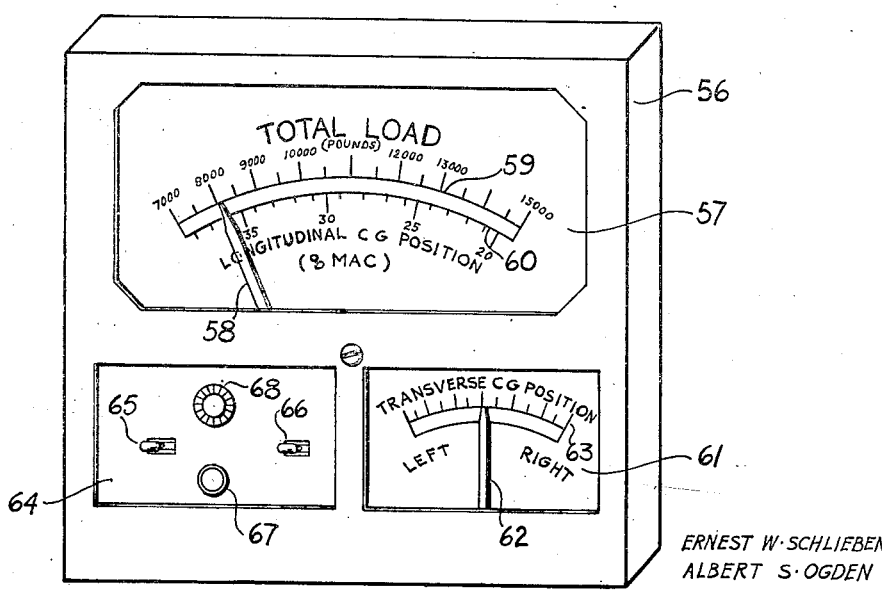
Fig. 4 is a perspective illustration of an electric station showing a possible embodiment of the invention.

Fig. 4 shows a possible embodiment of a station in which the main parts of the system according to the present invention may be accommodated. A casing 56 has at its front 3 openings for the accommodation of indicating instruments and switch means which form parts of the electric circuits explained hereafter. 57 is the dial of a galvanometer with a pointer 58. Two different scales are shown, the upper one 59 having a calibration for total loads, the lower one 60 having a calibration for the longitudinal center of gravity position determined by percentage of the mean aerodynamic chord (MAC).

At the lower right side the dial 61 of a second galvanometer is shown with a pointer 62 and a scale 63 calibrated to show the transverse center of gravity position.

The third opening of the casing front accommodates an instrument board 64 with two lever switches 65, 66, a switch knob 67 and a control knob 68.

Suitable connecting means for electric wires leading for instance to a battery and to the different electric resistors at the shock struts are provided, preferably at the rear of the casing, but are not shown in the drawings.

Figure 5:
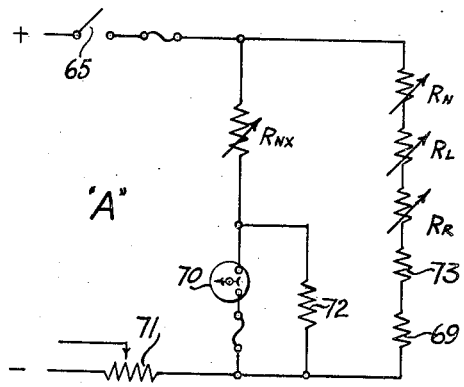
Figs. 5, 6 and 7 are each diagrammatic illustrations of the electric circuits used according to the invention.
Figure 6:
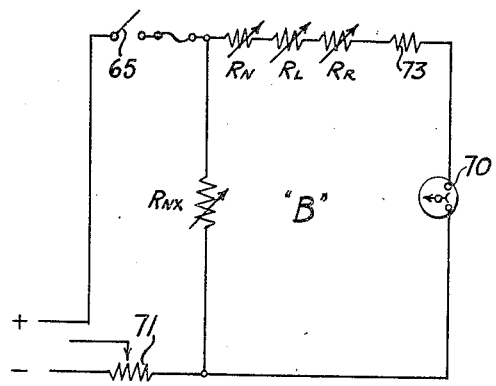
Figure 7:
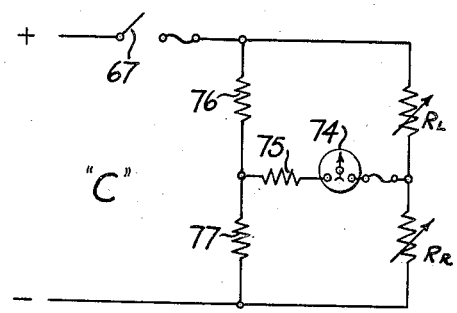

Figs. 5 to 7 inclusive show the different electric circuits used according to the invention. For easier reference the circuits have been given letters A to C inclusive as indicated on the drawings. For the same reason reference letters have been used for those variable resistors which are associated with the different shock struts, namely, $R_N$ for the resistor associated with the shock strut at the nose wheel, $R_L$ and $R_R$ for the resistors associated with the shock struts at the left and the right wheel respectively, and $R_{NX}$ for an additional resistor associated with the nose wheel shock strut. In the embodiment of the invention as described in connection with the accompanying drawings, all parts of the electric circuits according to Figs. 5 to 7 are accommodated in or on the station shown in Fig. 4, except for the resistors $R_N$, $R_{NX}$, $R_L$, and $R_R$ which are in the illustrated embodiment of the invention attached to the associated shock struts as shown for instance in Figs. 2 and 3.

Circuit A shown in Fig. 5 comprises a switch 65, a variable resistor 71, a further variable resistor $R_{NX}$ and, in series with the latter, a galvanometer 70. A resistor 72 is in conventional way shunt connected with the galvanometer so that a current of the magnitude desired in $R_{NX}$ can be measured. Resistor $R_{NX}$, as mentioned before, is associated with the shock strut at the nose wheel, for instance in the way shown in Figs. 2 and 3. In shunt connection with resistor $R_{NX}$ and galvanometer 70 is a "resistor bank" comprising two fixed resistors 73 and 69 and the variable resistors $R_N$, $R_L$ and $R_R$ which are associated with the shock struts at the nose, the left main and the right main wheel respectively, for instance in the way shown in Figs. 2 and 3. The total resistance of the resistor bank is equal to the resistance in the corresponding parts of circuit B shown in Fig. 6. Resistor 73 corresponds to an assumed initial weight of the aircraft. Resistor 69 corresponds to the resistance offered by the galvanometer used in circuit B. The effect and operation of circuit A will be described after the description of circuit B.

Circuit B, as shown in Fig. 6, contains again the variable resistors $R_N$, $R_L$ and $R_R$ in series with resistor 73. In this case the galvanometer 70 is in series with these resistors, while resistor $R_{NX}$ is again in shunt connection with the resistor bank. Circuit B contains furthermore, the switch 65 and variable resistor 71.

When during or after the loading of an aircraft equipped with the apparatus according to the invention the longitudinal position of the center of gravity is to be determined the procedure is as follows:

In the beginning of the operation, switch 65 which is shown in Fig. 4 as a lever switch which is especially advantageous for this purpose is moved to the left position which may close circuit A while the extreme right position closes circuit B and the neutral center position puts both circuits out of operation. Now circuit A is adjusted to a specified current by means of the control knob 68 which operates the variable resistor 71 (Fig. 5) until galvanometer 70 shows the desired reading. By doing so, any inaccuracy which may result from variations in the voltage of the electric source is at the same time eliminated. The indication is read from scale 60 (Fig. 4). After circuit A has thus been adjusted, switch 65 is moved to the extreme right bringing thereby circuit B into operation.

Circuit B is based on the fact that the C. G. distance from the main wheels (in the example under consideration) is a function of the quotient $$\frac{\text{load on nose wheel}}{\text{total load}}$$

The resistance in resistor $R_{NX}$ is proportional to the nose wheel load. The reading on the galvanometer is an indication for $$i = \frac{E}{R_N + R_L + R_R + R_{73}}$$

where $i$ is the amperage, $E$ the voltage and the denominator of the quotient the total resistance in the resistor bank. This quotient is therefore, equivalent to the quotient $$\frac{\text{load on nose wheel}}{\text{total load}}$$

and therefore, the reading on the galvanometer an indication for the distance of the C. G. from the main wheel, i. e. an indication for the longitudinal position of the C. G.

Circuit C as shown in Fig. 7 is a standard Wheatstone bridge comprising in addition to the galvanometer 74 with resistor 75, in one branch the variable resistors $R_L$ and $R_R$ (associated with the two main wheel struts) and in the other branch two equal fixed resistors 76 and 77. A switch 67 is provided which is shown on the board in Fig. 4 as a push-button. When the push-button is depressed, circuit C is in operation. It is obvious from the foregoing that the reading on galvanometer 74 is immediately an indication of the difference in resistance in the resistors $R_L$ and $R_R$. The magnitude of these resistances is proportional to the loads on the two main wheels, i. e. to the loads on the left-hand and on the right-hand side of the longitudinal axis of the aircraft. The reading on the galvanometer is therefore at the same time an indication for the difference of the loads on the two main wheels, in other words, a qualitative indication for the transverse position of the C. G. as determined by the loads on the main wheels.

With the system and apparatus according to the invention, it is therefore easy, by means of merely three switch operations, to determine the longitudinal and the transverse position of the C. G. of the aircraft.

Figure 8:
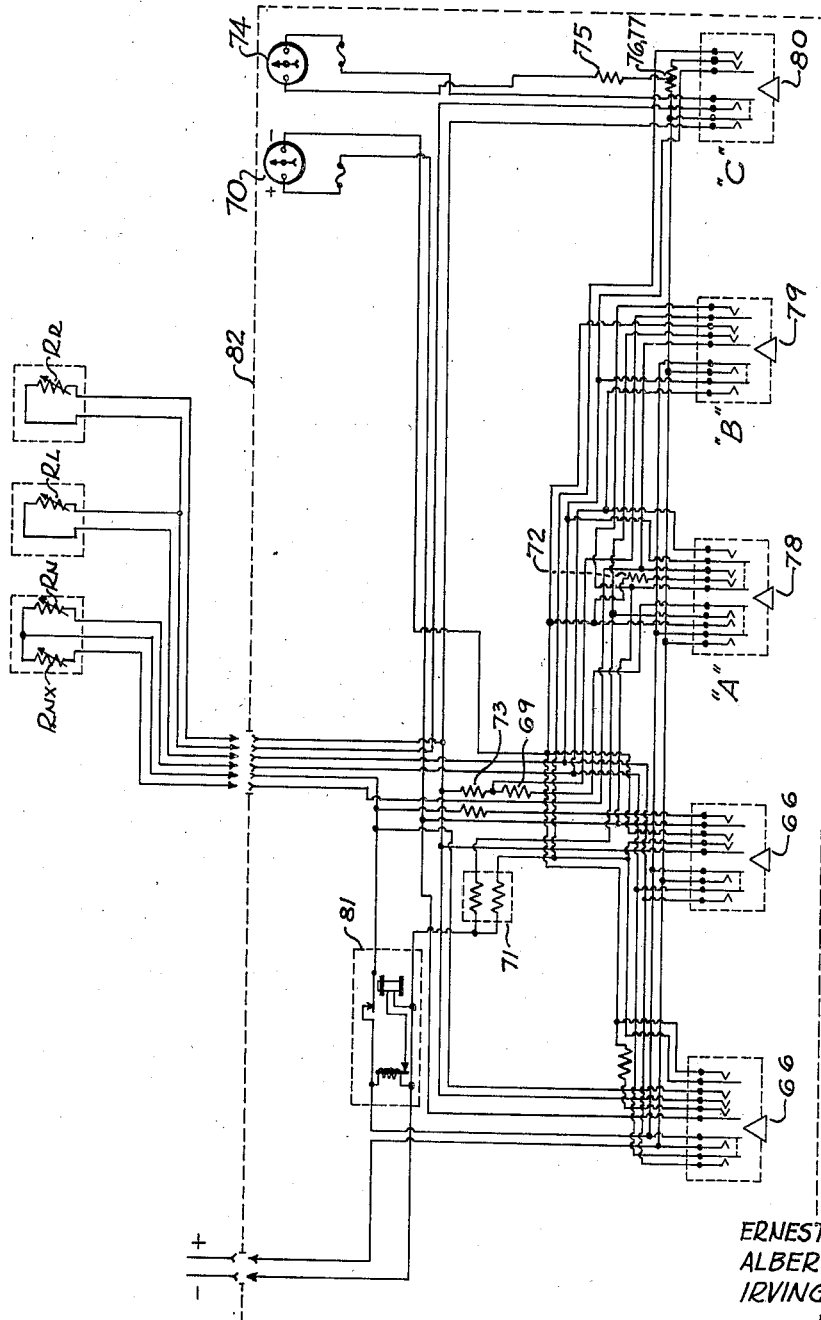
Fig. 8 is a wiring diagram showing the combined electric circuits of Figs. 5, 6 and 7.

Fig. 8 illustrates a wiring diagram showing the combination of the three circuits A, B and C which has just been described. As far as possible the same reference numbers are being used for the single parts of the diagram as in Figs. 5, 6 and 7 of the drawings. The switches 65 and 67 of Figs. 5, 6 and 7 are shown as three push button switches 78, 79 and 80 in Fig. 8. They belong to the three circuits A, B and C respectively as indicated in Fig. 8 in conformance with the designations in the previous figures. Push button 78 corresponds to switch 65 in Figs. 4 and 5 in one position of the lever, while push button 79 corresponds to switch 65 in Figs. 4 and 6 in the opposite position of the lever shown in Fig. 4.

Besides the circuits A, B, and C, two more circuits are incorporated in Fig. 8 which are operated by two push buttons 66 which correspond to the switch lever 66 in Fig. 4 in its extreme positions. These circuits serve for the determination of the total weight of the aircraft as indicated on scale 59 in Fig. 4. It is advantageous to combine in one apparatus this load determination with the determination of the horizontal center of gravity position. However, the load determination does not form a part of this invention and has therefore not been described in detail, nor have the parts in the wire diagram belonging only to the load establishment been designated by reference numbers.

81 in Fig. 8 is a time delay relay to open the circuit if the switches are inadvertently held closed for a considerable length of time. A dotted line 82 framing most of the wire diagram indicates the outline of the station box, as for instance shown in Fig. 4, in which the circuits and instruments are accommodated. Fig. 8 indicates further the points at which the wires are leaving the station box in order to be connected with a source of electricity and with the different resistances associated with the shock struts of the airplane. All junction boxes, plugs and similar parts necessary in such electric wiring have been omitted from Fig. 8 in order not to confuse the figure.

From the foregoing description it can be seen that the system and apparatus according to the invention represent convenient means to determine the horizontal position of the center of gravity of a loaded aircraft. With the automatic adjustment of the variable resistors associated with the shock struts, it is merely necessary to perform three simple switching operations in order to read immediately from two instruments the disposition of the load. Due to the arrangement of the circuits all inaccuracies as to voltage differences are eliminated.

Though the embodiment of the invention shown in the foregoing description and in the drawings refers to an aircraft with three supporting struts, it is obvious for those skilled in the art that the same system of determination of the disposition of the load can be similarly applied to an aircraft with four supporting struts by adjusting the electric circuits and switch means accordingly. Though the invention has been shown in application to hydraulically operated shock struts, it can be used with the same advantages in connection with any other kind of pressure responsive supporting means. Likewise, the arrangement and operation of the variable resistors associated with the supporting means may be performed in many different ways within the scope of the present invention. Many other variations and combinations of means are possible within the scope of the invention as set forth in the following claims.

What we claim is:

1. In an aircraft with two main ground supporting members arranged symmetrically about and on a line perpendicular to the centerline of the aircraft and an auxiliary ground supporting member arranged on said centerline in some distance from said perpendicular line, means for the determination of the longitudinal center of gravity position of the loaded aircraft comprising an electric system containing the following elements: three variable electric resistors each mechanically connected with a load responsive element of a different one of said ground supporting members, said mechanical connections being such that the variation in electrical resistance of each resistor will be directly proportional to the variation of load in the supporting member associated with said resistor, said three variable resistors being electrically connected in series with each other and with a fixed resistor and a galvanometer so that the total series resistance varies in proportion to the total load on the supporting members; an additional, fourth variable electric resistor, also mechanically connected in the aforementioned manner with said auxiliary supporting member; a power supply for energizing the aforementioned electric elements comprising a source of direct electric current and a series adjustable resistor, said fourth variable resistor being connected across said power supply, and the series combination of said three variable resistors, the fixed resistor, and the galvanometer being connected in parallel with said fourth resistor; a switching mechanism adapted to temporarily modify the electric connections from the described normal circuit to a preliminary circuit in which said galvanometer is switched from the described series connection to a connection in series with said fourth variable electric resistor also reconnecting the series of said three variable resistors and said fixed resistor across said electric source so that by means of said adjustable resistor the current through said fourth variable resistor can be adjusted to a predetermined value making the potential difference across said fourth resistor in consequence of load variations on said auxiliary supporting member proportional to the load on said auxiliary member; said described normal circuit producing a reading on said galvanometer giving a direct indication of the longitudinal center of gravity position since the galvanometer reading represents the quotient $$\frac{E}{R}$$

where E is equivalent to the load on the auxiliary member and R equivalent to the total load on all supporting members, said quotient therefore being equivalent to $$\frac{\text{load on auxiliary supporting member}}{\text{total load on all supporting members}}$$

which is an indication for the distance of the center of gravity from the two main supporting members.

2. In an aircraft with two main ground supporting members arranged symmetrically about and on a line perpendicular to the centerline of the aircraft and an auxiliary ground supporting member arranged on said centerline in some distance from said perpendicular line, an electric system for automatically determining the value of the quotient $$\frac{\text{load on auxiliary supporting member}}{\text{total load on all supporting members}}$$

as an indication for the longitudinal center of gravity position of the loaded aircraft, said electric system comprising in combination: a power supply comprising a source of direct electric current and a series adjustable resistor; a variable electric resistor connected across the output of said power supply and mechanically connected in such a manner with said auxiliary supporting member that its resistance varies in direct proportion to the load on said auxiliary supporting member; a bank of electric resistors mechanically arranged so in relation to said three supporting members that the aggregate resistance in said resistor bank is a function of the total load on the three supporting members; a galvanometer connected in series with said resistor bank, said resistor bank and galvanometer being normally connected in parallel with said variable resistor; switching means by means of which the described normal electric connections of the aforementioned parts may be temporarily modified so that the galvanometer is removed from its series connection with said resistor bank and instead series connected with said variable resistor, said resistor bank being reconnected parallel said variable resistor and said galvanometer so that the current through said variable resistor may be adjusted by means of said adjustable resistor to a predetermined value making the potential difference across said variable resistor directly proportional to the load on the auxiliary supporting member, said normal electric connection therefore indicating the desired quotient as an equivalent of the quotient $$\frac{E}{R}$$

which will be read from the galvanometer.

3. In a system according to claim 1 means for also determining the lateral position of the center of gravity of the loaded aircraft comprising additional switching means adapted to modify the interconnection of the different parts of the system so that the galvanometer forms part of an electrical bridge one of the two legs of one branch of which are formed by the left hand and right hand variable resistors respectively while each leg of the second branch of said bridge contains additional fixed resistors making the reading of the galvanometer an indication for the lateral position of the center of gravity.

4. In an aircraft with two groups of ground supporting members arranged each symmetrical about the longitudinal centerline of the aircraft and in some distance from each other along said longitudinal centerline, means for the determination of the longitudinal center of gravity position of the loaded aircraft comprising an electric system containing the following elements: a number of variable electric resistors corresponding to the number of ground supporting members, each of said resistors mechanically connected with a load responsive element of a different one of said ground supporting members, said mechanical connections being such that the variation in electrical resistance of each resistor will be directly proportional to the variation of load in the supporting member associated with said resistor, said variable resistors being electrically connected in series with each other and with a fixed resistor and a galvanometer so that the total series resistance varies directly with the total load on the supporting members; an additional variable electric resistor mechanically connected in the aforementioned manner with one of said groups of ground supporting members; a power supply for energizing the aforementioned electric elements comprising a source of direct electric current and a series adjustable resistor, said additional variable resistor being connected across said power supply, and the series combination of said variable resistors, the fixed resistor, and the galvanometer being connected in parallel with said additional resistor; a switching mechanism adapted to temporarily modify the electric connections from the described normal circuit to a preliminary circuit in which said galvanometer is switched from the described series connection to a connection in series with said additional variable electric resistor connecting thereby the series of said variable resistors and said fixed resistor across said electric source so that by means of said adjustable resistor the current through said additional variable resistor can be adjusted to a predetermined value making the potential difference across said additional resistor in consequence of load variations on the group of supporting members associated with said additional resistor proportional to the load on said group; said described normal circuit producing a reading on said galvanometer giving a direct indication of the longitudinal center of gravity position since the galvanometer reading represents the quotient $$\frac{E}{R}$$

where E is equivalent to the load on the group of supporting members associated with said additional resistor and R equivalent to the total load on all supporting members, said quotient therefore being equivalent to $$\frac{\text{load on one group of supporting members}}{\text{total load on all supporting members}}$$

which is an indication for the longitudinal position of the center of gravity between said two groups of supporting members.

ERNEST W. SCHLIEBEN.
ALBERT S. OGDEN.
IRVING BERLER.